US012559177B2

(12) United States Patent
Standifer

(10) Patent No.: US 12,559,177 B2
(45) Date of Patent: Feb. 24, 2026

(54) SUBFRAME ATTACHMENT SYSTEM FOR VEHICLE

(71) Applicant: Ford Global Technologies, LLC, Dearborn, MI (US)

(72) Inventor: Cliff Standifer, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 387 days.

(21) Appl. No.: 18/446,565

(22) Filed: Aug. 9, 2023

(65) Prior Publication Data

US 2025/0050948 A1 Feb. 13, 2025

(51) Int. Cl.
| *B62D 21/09* | (2006.01) |
| *B62D 21/17* | (2006.01) |
| *B62D 27/06* | (2006.01) |

(52) U.S. Cl.
CPC ............. *B62D 21/09* (2013.01); *B62D 21/17* (2013.01); *B62D 27/065* (2013.01)

(58) Field of Classification Search
CPC ....... B62D 21/09; B62D 21/17; B62D 27/065
See application file for complete search history.

(56) References Cited

U.S. PATENT DOCUMENTS

| 7,793,968 | B1 | 9/2010 | Withers |
| 9,150,067 | B2 | 10/2015 | Hartleip et al. |
| 10,967,688 | B2 | 4/2021 | Garner et al. |
| 12,005,956 | B2 * | 6/2024 | Mortenson ............. B62D 21/11 |

FOREIGN PATENT DOCUMENTS

| JP | 4075445 B2 * | 4/2008 |
| JP | 6658359 B2 * | 3/2020 |

* cited by examiner

*Primary Examiner* — Faye M Fleming
(74) *Attorney, Agent, or Firm* — Burris Law, PLLC

(57) ABSTRACT

A subframe attachment system includes mounting brackets configured to be attached to a respective longitudinal rail of a vehicle frame. Each mounting bracket includes a mounting structure configured to be accessible from the cargo bed, an inner member, and outer member. The inner member is located at an inboard side of the respective longitudinal rail and includes a first upper end positioned above a top side of the respective longitudinal rail and a first lower end positioned below a bottom side of the respective longitudinal rail. The outer member is located at an outboard side of the respective longitudinal rail and includes a second upper end positioned above the top side of the respective longitudinal rail and secured to the first upper end of the inner member, and a second lower end position below the bottom side of the respective longitudinal rail and secured to the first lower end.

20 Claims, 13 Drawing Sheets

SUBFRAME ATTACHMENT SYSTEM FOR VEHICLE

FIELD

The present disclosure relates to a subframe attachment system for a vehicle and a vehicle having a subframe attachment system.

BACKGROUND

The statements in this section merely provide background information related to the present disclosure and may not constitute prior art.

It is generally known in the towing industry to utilize a fifth wheel or hitch or a gooseneck hitch to secure a trailer to a bed of a towing vehicle, such as a pickup truck. Underbed systems have been developed to accommodate either a fifth wheel hitch system or a gooseneck hitch system. Such systems, however, typically cannot accommodate both the fifth wheel hitch and the gooseneck hitch without requiring a labor-intensive conversion process. Furthermore, such systems do not provide for additional uses other than accommodating the fifth wheel hitch or the gooseneck hitch.

These issues related to hitch systems, among other issues related to hitch systems, are addressed by the present disclosure.

SUMMARY

This section provides a general summary of the disclosure and is not a comprehensive disclosure of its full scope or all of its features.

In one form, the present disclosure provides a subframe attachment system for a vehicle having a cargo bed. The subframe attachment system includes a plurality of mounting brackets spaced apart from each other and configured to be attached to first and second longitudinal rails of a vehicle frame independently of each other. Each mounting bracket of the plurality of mounting brackets includes a mounting structure configured to be accessible from the cargo bed. Each mounting bracket of the plurality of mounting bracket further includes an inner member and an outer member. The inner member is located at an inboard side of a respective longitudinal rail of the first and second longitudinal rails and includes a first upper end, a first lower end, and a first body portion. The first upper end is positioned above a top side of the respective longitudinal rail and the first lower end is positioned below a bottom side of the respective longitudinal rail. The first body portion connects the first upper end to the first lower end. The outer member is located at an outboard side of the respective longitudinal rail and includes a second upper end, a second lower end, and a second body portion. The second upper end is positioned above the top side of the respective longitudinal rail and secured to the first upper end of the inner member. The second lower end is position below the bottom side of the respective longitudinal rail and secured to the first lower end. The second body portion connects the second upper end to the second lower end.

In variations of the subframe attachment system of the above paragraph, which can be implemented individually or in any combination: the plurality of mounting brackets includes four mounting brackets; at least one mounting bracket of the plurality of mounting brackets includes an outer rail attachment portion extending from the second body portion of the outer member and configured to be mounted to the outboard side of the respective longitudinal rail and an inner rail attachment portion extending from the first body portion of the inner member and configured to be mounted to the inboard side of the respective longitudinal rail; a compression tube configured to extend at least partially through the respective longitudinal rail and engaging the outer rail attachment portion and the inner rail attachment portion; a fastener extending through the outer rail attachment portion, the inner rail attachment portion, and the compression tube to secure the inner member, the outer member and the compression tube to each other; a first annular protrusion extending from a first surface of the outer rail attachment portion facing the outboard side of the respective longitudinal rail and configured to be received in a first opening formed in the outboard side of the respective longitudinal rail; a second annular protrusion extending from a second surface of the inner rail attachment portion facing the inboard side of the respective longitudinal rail and configured to be received in a second opening formed in the inboard side of the respective longitudinal rail; the inner member of each mounting bracket of the plurality of mounting brackets has an L-shaped cross-section; a first fastener extending through the first upper end of the inner member and the second upper end of the outer member to secure the inner member and the outer member to each other; a second fastener extending through the first lower end of the inner member and the second lower end of the outer member to further secure the inner member and the outer member to each other; at least one mounting bracket of the plurality of mounting brackets includes the inner member having a channel formed in the first body portion that is configured to receive one or more vehicle components; the one or more vehicle components include at least one of a brake line and a wire harness; the cargo bed having a floor, the floor of the cargo bed defining apertures through which the mounting structures are accessible from above the floor of the cargo bed; and at least one mounting bracket of the plurality of mounting brackets includes an annular protrusion extending from a bottom surface of the second upper end of the outer member and is configured to be received in an opening formed in the top side of the respective longitudinal rail.

In another form, the present disclosure provides a subframe attachment system for a vehicle having a cargo bed. The subframe attachment system includes a plurality of mounting brackets configured to be attached to first and second longitudinal rails of a vehicle frame independently of each other. Each mounting bracket of the plurality of mounting brackets includes a mounting structure configured to be accessible from the cargo bed. Each mounting bracket of the plurality of mounting bracket further includes an inner member and an outer member. The inner member is located at an inboard side of a respective longitudinal rail of the first and second longitudinal rails and includes a first upper end, a first lower end, and a first body portion. The first upper end is positioned above a top side of the respective longitudinal rail and the first lower end is positioned below a bottom side of the respective longitudinal rail. The first body portion connects the first upper end to the first lower end. The outer member is located at an outboard side of the respective longitudinal rail and includes a second upper end, a second lower end, and a second body portion. The second upper end is positioned above the top side of the respective longitudinal rail and secured to the first upper end of the inner member. The second lower end is position below the bottom side of the respective longitudinal rail and secured to the first lower end. The second body portion connects the second upper end to the second lower end. At least one first fastener extending through the first upper end of the inner member and the second upper end of the outer member to secure the inner member and the outer member to each other. At least one second fastener extending through the first lower end of the inner member and the second lower end of the outer member to further secure the inner member and the outer member to each other. The mounting structure of each mounting bracket extends from the inner member and extends at least partially through a respective access opening in the cargo bed.

In variations of the subframe attachment system of the above paragraph, which can be implemented individually or in any combination: at least one mounting bracket of the plurality of mounting brackets includes an outer rail attachment portion extending from the second body portion of the outer member and configured to be mounted to the outboard side of the respective longitudinal rail; an inner rail attachment portion extending from the first body portion of the inner member and configured to be mounted to the inboard side of the respective longitudinal rail; a compression tube configured to extend at least partially through the respective longitudinal rail and engaging the outer rail attachment portion and the inner rail attachment portion; a third fastener extending through the outer rail attachment portion, the inner rail attachment portion, and the compression tube to secure the inner member, the outer member and the compression tube to each other; at least one mounting bracket of the plurality of mounting brackets includes the inner member having a channel formed in the first body portion that is configured to receive one or more vehicle components; the vehicle frame includes the first and second longitudinal rails; and at least one mounting bracket of the plurality of mounting brackets includes an annular protrusion extending from a bottom surface of the second upper end of the outer member and is configured to be received in an opening formed in the top side of the respective longitudinal rail.

In yet another form, the present disclosure provides a method for securing a plurality of mounting brackets to first and second longitudinal rails of a vehicle frame having a cargo bed secured thereto. The method includes positioning an inner member of each mounting bracket of the plurality of mounting brackets at an inboard side of a respective longitudinal rail of the first and second longitudinal rails while the cargo bed is secured to the vehicle frame, positioning an outer member of each mounting bracket of the plurality of mounting brackets at an outboard side of the respective longitudinal rail while the cargo bed is secured to the vehicle frame, inserting at least one first fastener through a first upper end of the inner member and a second upper end of the outer member to secure the inner member and the outer member to each other; and inserting at least one second fastener through a first lower end of the inner member and a second lower end of the outer member to further secure the inner member and the outer member to each other. The inner member includes the first upper end, the first lower end, and a first body portion connecting the first upper end to the first lower end. The first upper end is positioned above a top side of the respective longitudinal rail and the first lower end positioned below a bottom side of the respective longitudinal rail. The outer member includes the second upper end, the second lower end, and a second body portion connecting the second upper end to the second lower end. The first upper end is positioned above a top side of the respective longitudinal rail and the first lower end is positioned below a bottom side of the respective longitudinal rail.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
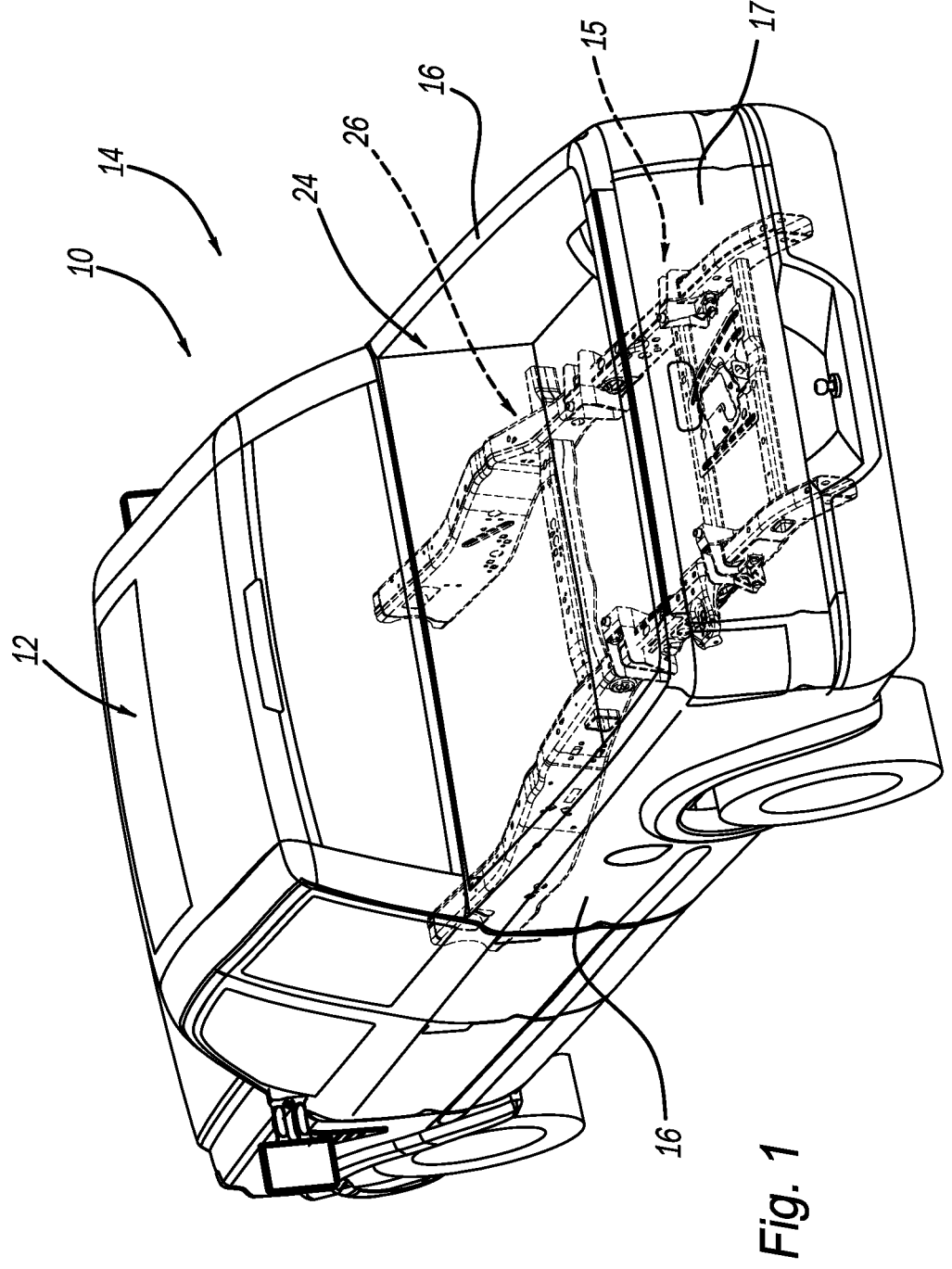
FIG. 1 is a perspective view of a vehicle including a subframe attachment system according to the principles of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to FIG. 1, a vehicle 10 such as a pick-up truck, for example, is illustrated. The vehicle 10 includes a cab 12, a plurality of wheels, a cargo bed or component 14, and a subframe attachment system 15. The cargo bed 14 extends from the cab 12 and includes a plurality of side walls 16 and a tailgate 17. The plurality of side walls 16 extend from an aft end of the cab 12. The tailgate 17 is coupled to the side walls 16 and is pivotable about a horizontal axis (not shown) between a closed position (shown) and an open position (not shown). When the tailgate 17 is in the closed position, the tailgate 17 cooperates with the side walls 16 and the cargo bed 14 to define a partially enclosed cargo area 24. The top of the cargo area 24 can be generally open, as shown, though a removable or retractable cover (e.g., tonneau cover or truck cap) can be used. When the tailgate 17 is in the open position, the side walls 16 define an opening to the cargo area 24. In one example, cargo such as 2x4s, piping, tubing and other materials to be transported from a facility to a jobsite or dwelling, for example, may be stored and transported in the cargo area 24.

Figure 2:
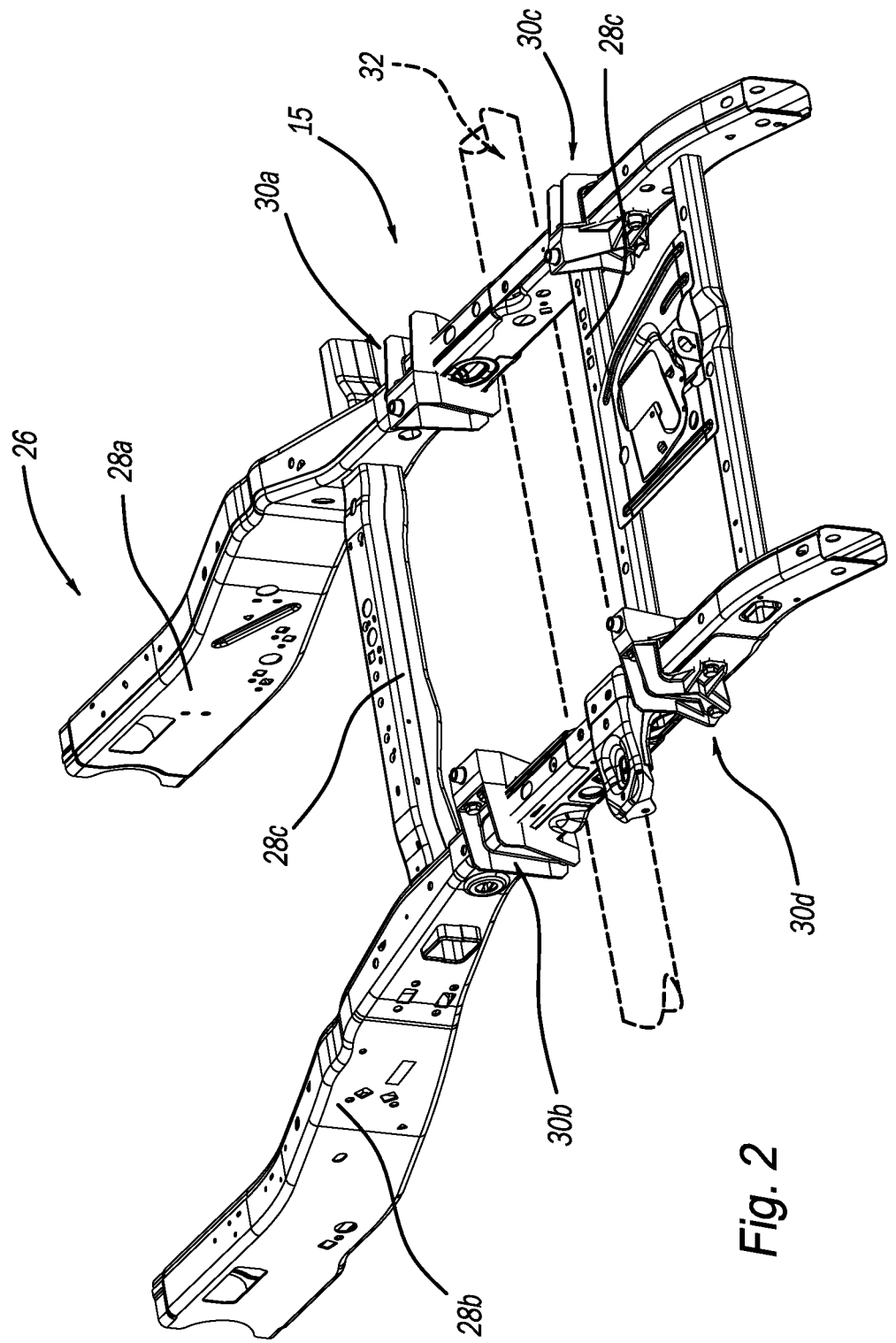
FIG. 2 is a perspective view of the subframe attachment system of FIG. 1 mounted to a frame of the vehicle.
Figure 3:
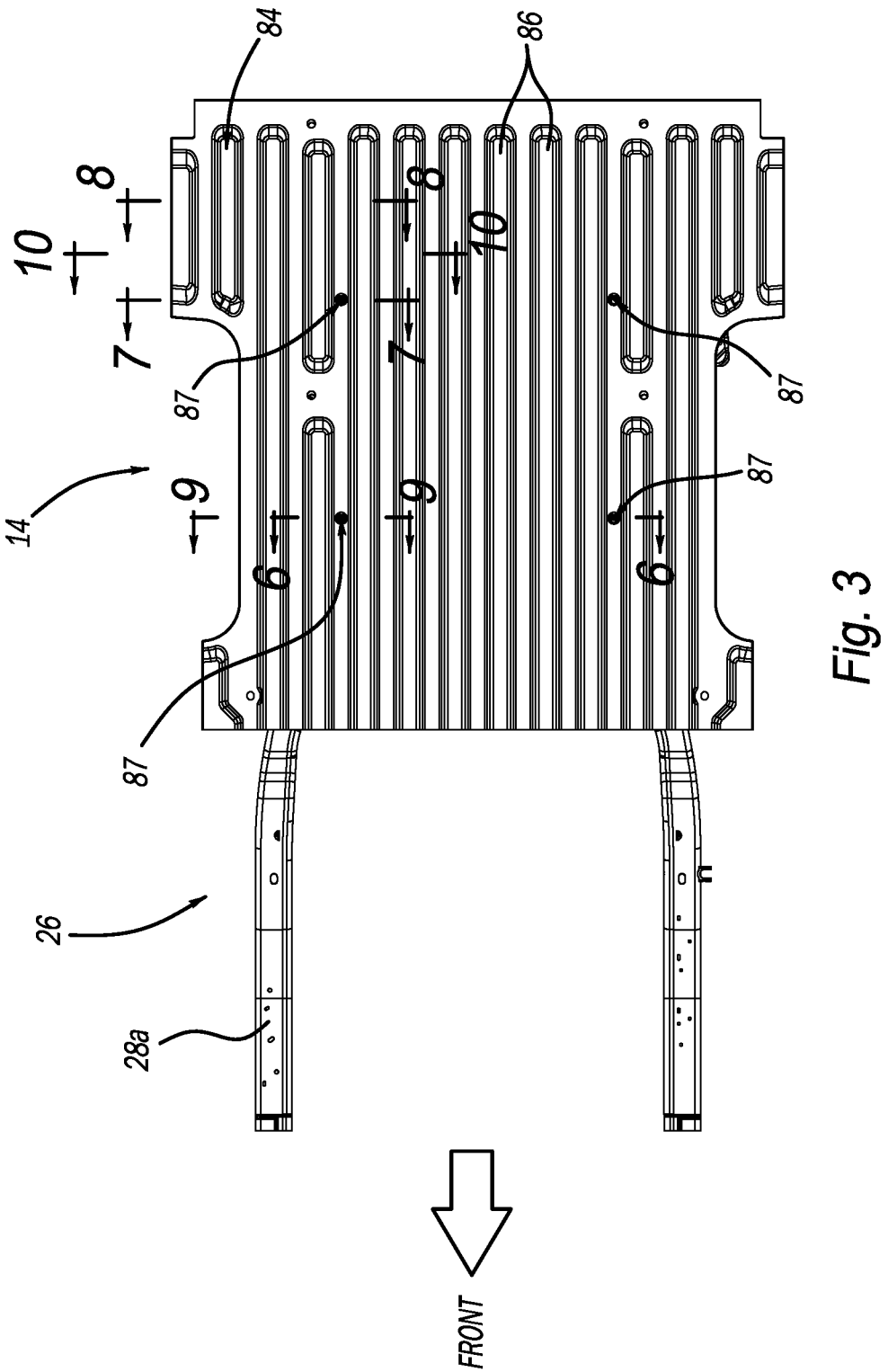
FIG. 3 is a top view of the subframe attachment system of FIG. 1 mounted to a frame of the vehicle and extending through a floor of a cargo bed of the vehicle.

With additional reference to FIGS. 2 and 3, a vehicle frame 26 is the main supporting structure of the vehicle 10, to which various components such as the cargo bed 14 are attached either directly or indirectly. The vehicle frame 26 includes opposed longitudinal rails 28a, 28b and one or more cross members 28c (FIG. 2). The rails 28a, 28b are spaced apart from each other and may establish a length of the vehicle frame 26. The cross members 28c extend in a transverse direction of the vehicle 10 and are spaced apart from each other along a longitudinal direction of the vehicle 10. The cross members 28c also connect the rails 28a, 28b to each other.

The subframe attachment system 15 is mounted to the vehicle frame 26 and is substantially located underneath the cargo bed 14. The subframe attachment system 15 may be secured to the vehicle frame 26 without removal of the cargo bed 14. In this way, the time to install the subframe attachment system 15 to the vehicle 10 is reduced. It should also be understood that the subframe attachment system 15 may be secured to the vehicle frame 26 with the cargo bed 14 removed from the vehicle frame 26. The subframe attachment system 15 includes a plurality of mounting brackets 30a, 30b, 30c, 30d spaced apart from each other and attached to a respective longitudinal rail 28a, 28b of the opposed longitudinal rails 28a, 28b independently of each other. That is, the mounting bracket 30a is attached to the longitudinal rail 28a and located forward a rear axle 32 (FIG. 2), the mounting bracket 30b is attached to the longitudinal rail 28b and located forward the rear axle 32, the mounting bracket 30c is attached to the longitudinal rail 28a and located rearward the rear axle 32, and the mounting bracket 30d is attached to the longitudinal rail 28b and located rearward the rear axle 32.

Figures 4A, 4B:
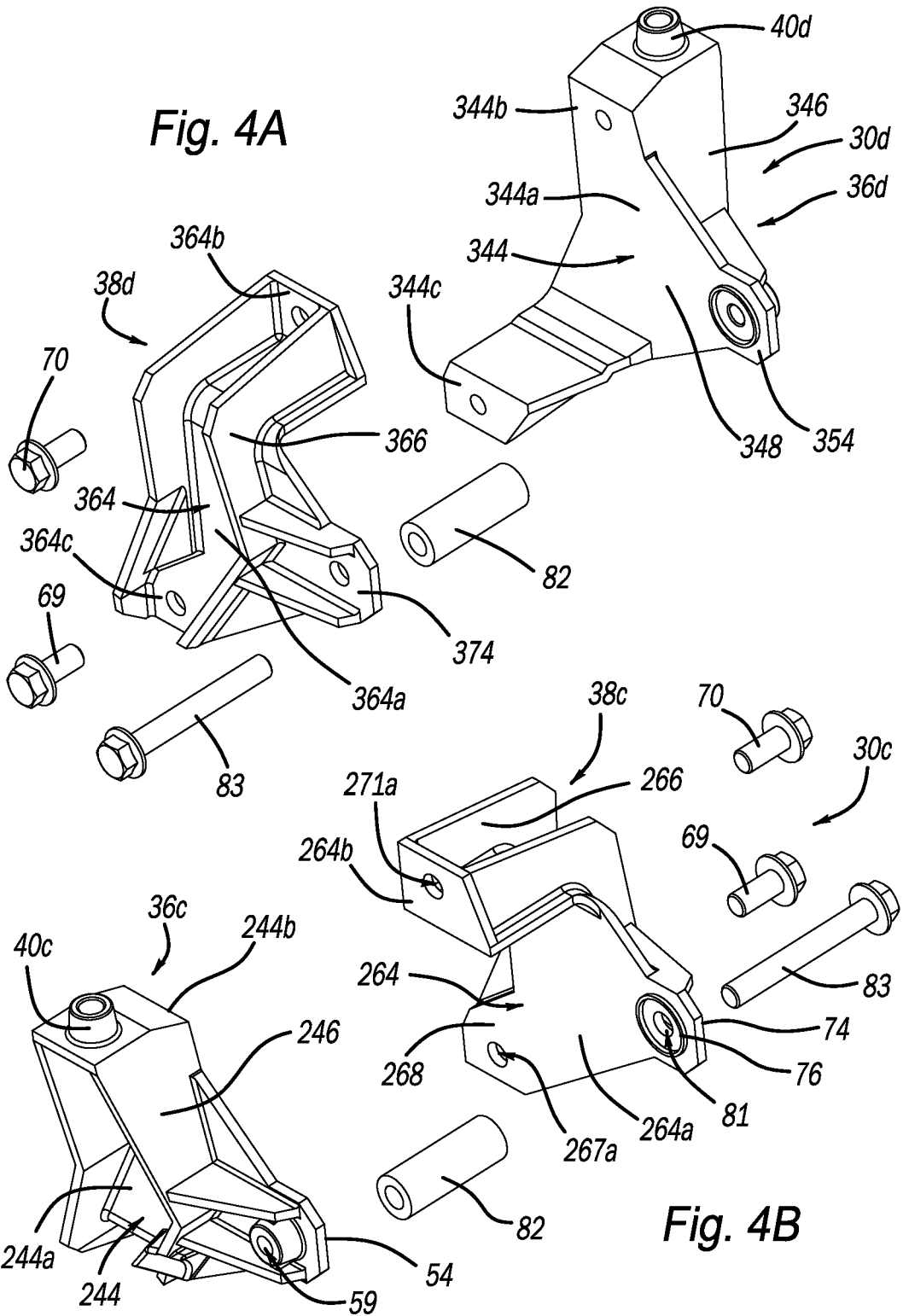
FIGS. 4A-4D are exploded perspective views of mounting brackets of the subframe attachment system of FIG. 1.
Figures 4C, 4D:
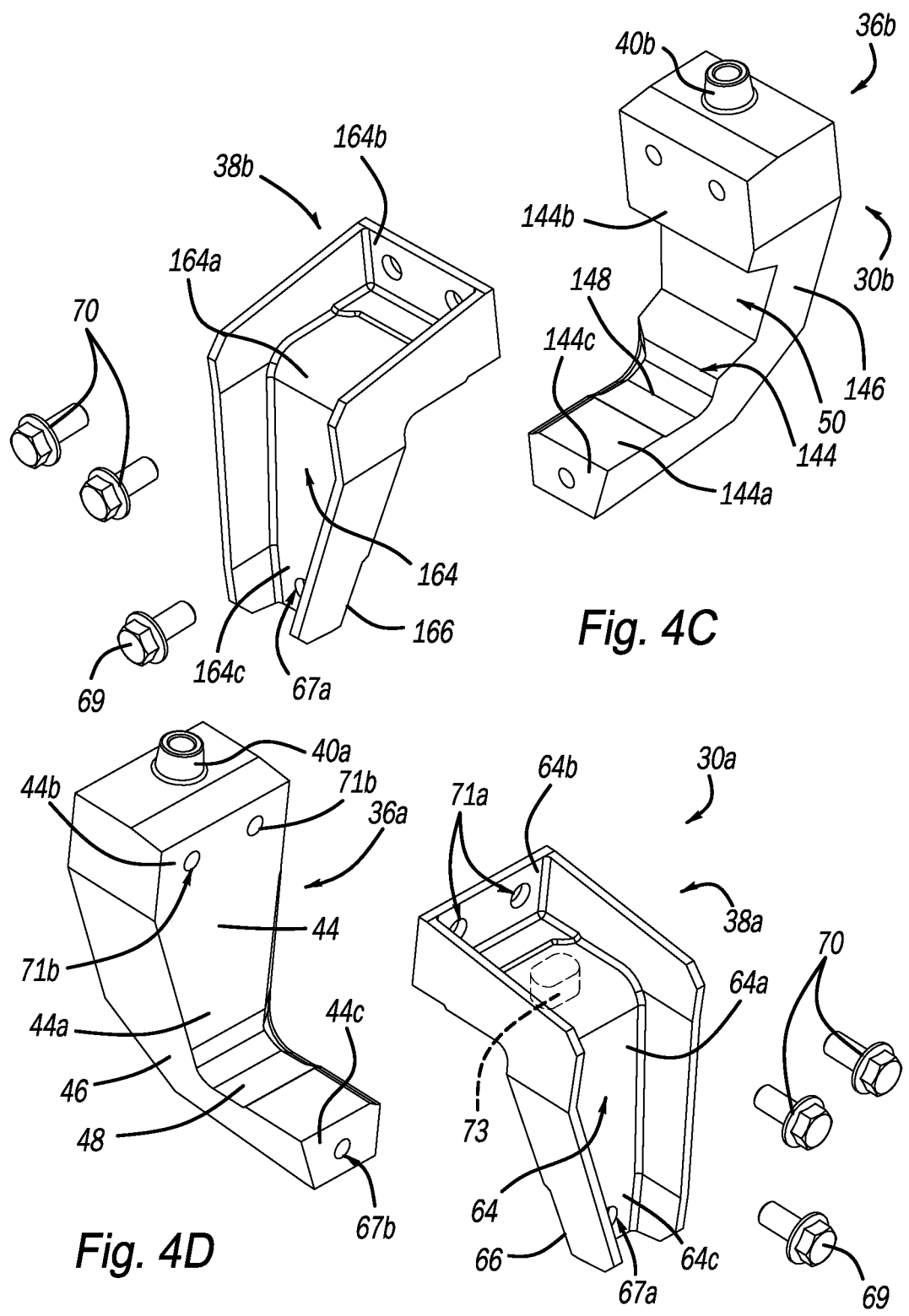
Figure 5A:
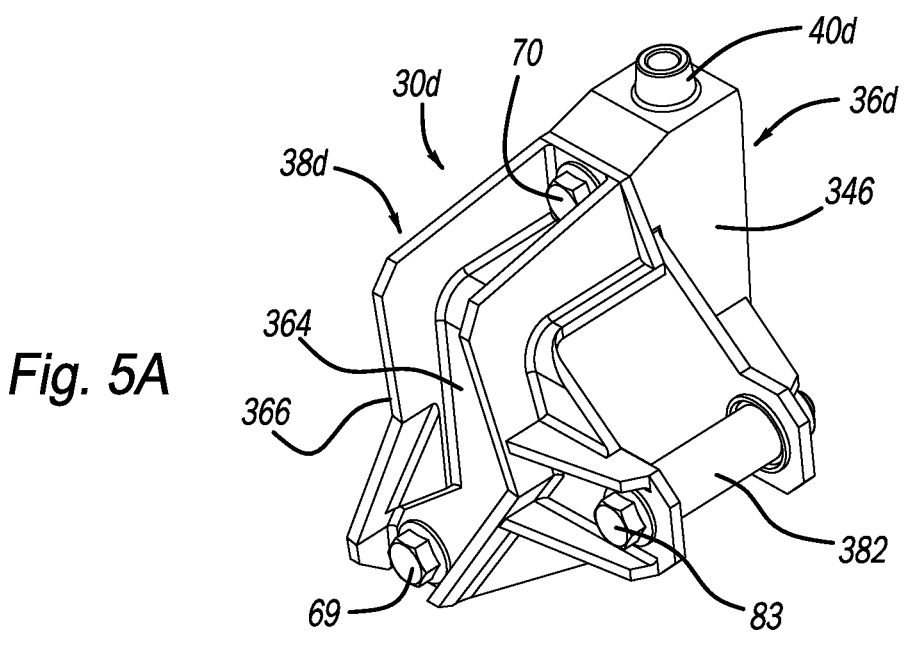
FIGS. 5A-5D are perspective views of the mounting brackets of the subframe attachment system of FIG. 1 assembled.
Figure 5B:
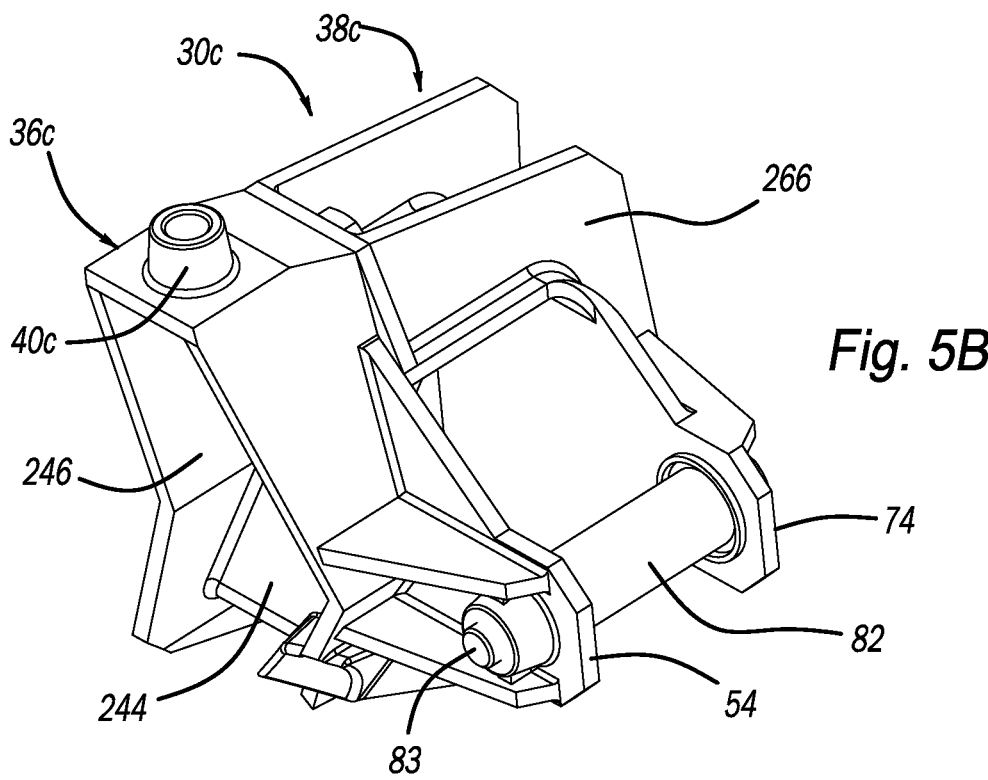
Figures 5C, 5D:
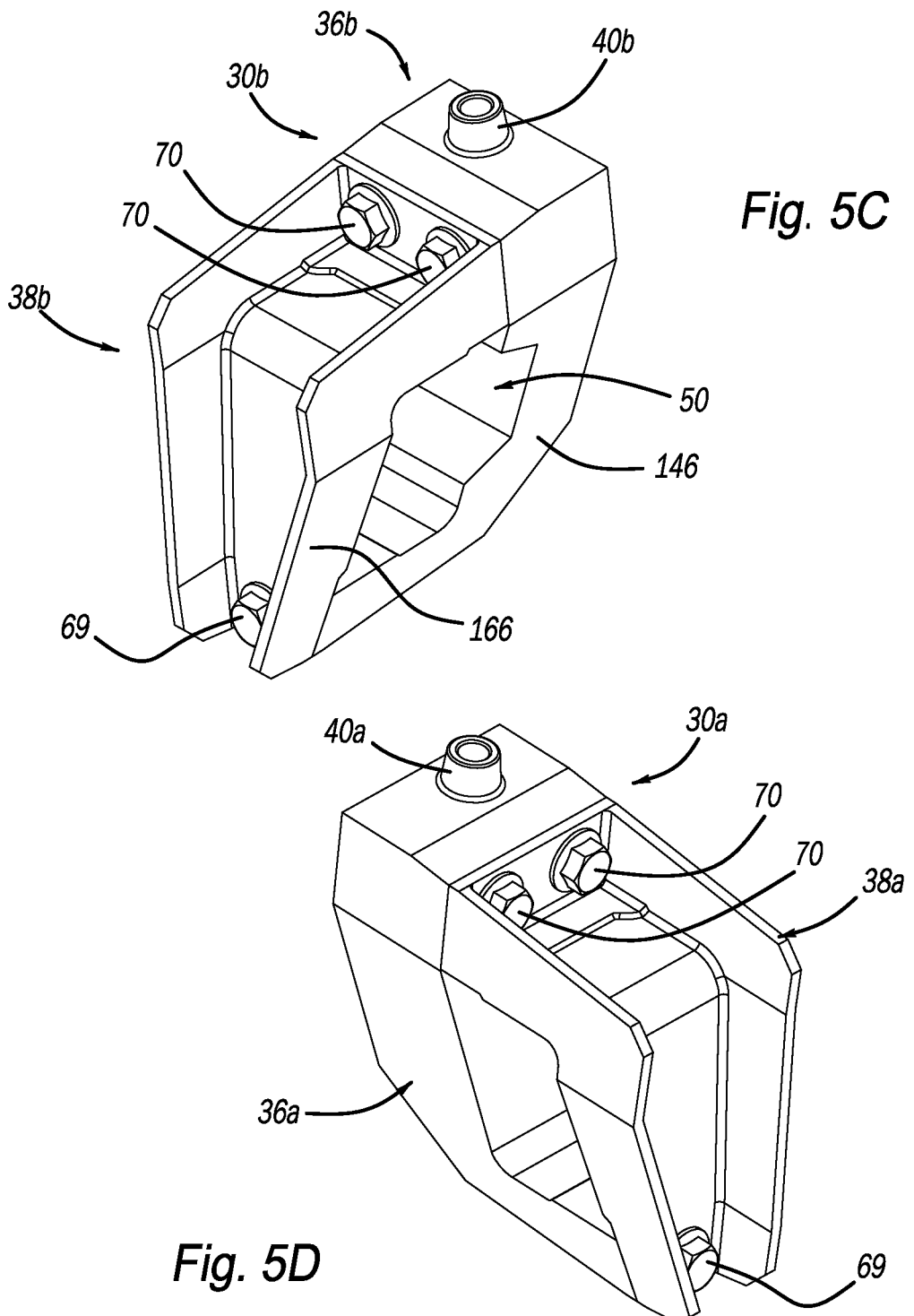
Figure 9:
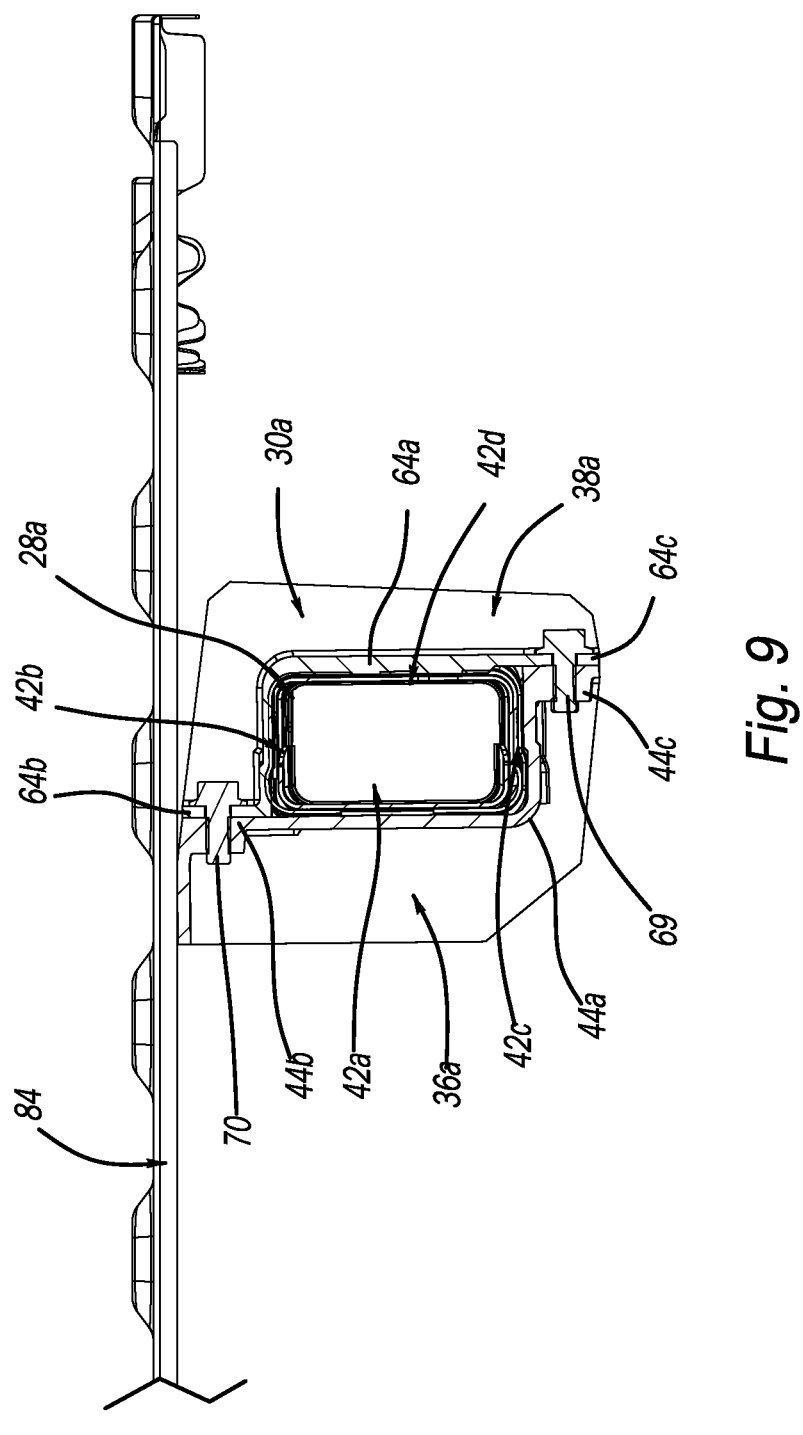
FIG. 9 is another cross-sectional view of a portion of the subframe attachment system of FIG. 1, taken along line 9-9 shown in FIG. 3.

With reference to FIGS. 4D and 5D, mounting bracket 30a includes an inner member 36a, an outer member 38a and a mounting structure 40a. The inner member 36a of mounting bracket 30a includes a body 44 and a rim 46. The body 44 includes a body portion 44a, an upper end 44b, and a lower end 44c. The body portion 44a has an inner surface 48a that engages the respective longitudinal rail 28a, 28b. Stated differently, substantially the entire inner surface 48a of the body portion 44a engages the respective longitudinal rail 28a, 28b. With reference FIG. 6, the body portion 44a also wraps around the lower inboard portion of the inboard side 42a of the respective longitudinal rail 28a, 28b. The upper end 44b extends upward from the body portion 44a and is positioned above a top side 42b of the respective longitudinal rail 28a, 28b. In the example illustrated, the upper end 44b extends upward in a substantially vertical direction from the body portion 44a and does not engage the respective longitudinal rail 28a, 28b (i.e., the upper end 44b is spaced apart from the respective longitudinal rail 28a, 28b). With reference to FIG. 9, the lower end 44c extends downward from the body portion 44a and is positioned below a bottom side 42c of the respective longitudinal rail 28a, 28b. In the example illustrated, the lower end 44c extends downward in a substantially vertical direction from the body portion 44a and does not engage the respective longitudinal rail 28a, 28b (i.e., the lower end 44c is spaced apart from the respective longitudinal rail 28a, 28b). With reference to FIG. 4D, the rim 46 extends substantially perpendicular from a periphery of the body 44 and extends at least partially around the periphery of the body 44. In this way, the stiffness of the inner member 36a is enhanced.

Figure 6:
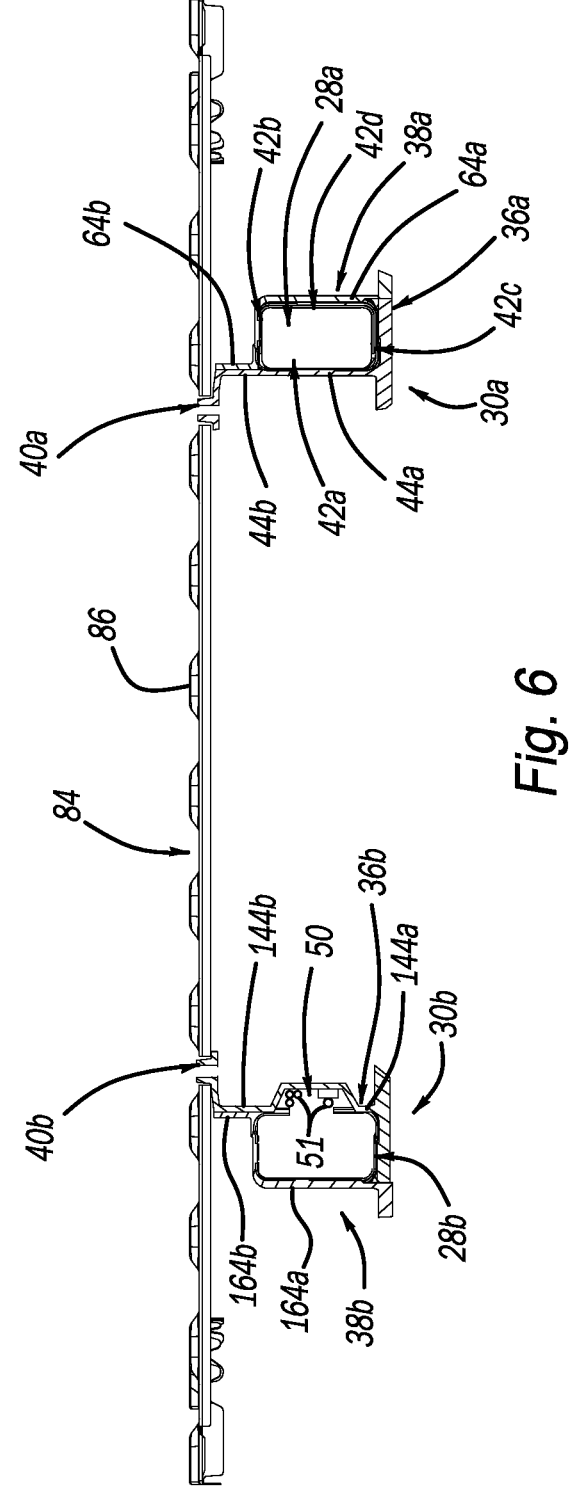
FIG. 6 is a cross-sectional view of a portion of the subframe attachment system of FIG. 1, taken along line 6-6 shown in FIG. 3.

The outer member 38a is located at an outboard side 42d of the respective longitudinal rail 28a, 28b of the vehicle frame 26 and at least partially wraps around the outboard side 42d of the respective longitudinal rail 28a, 28b. That is, in the example illustrated, the outer member 38a wraps around an upper outboard portion of the outboard side 42d of the respective longitudinal rail 28a, 28b. In some forms, the outer member 38a may wrap around one or both of a lower outboard portion of the outboard side 42d of the respective longitudinal rail 28a, 28b and the upper outboard portion of the outboard side 42d of the respective longitudinal rail 28a, 28b without departing from the scope of the present disclosure. With reference back to FIGS. 4D and 5D, the outer member 38a includes a body 64 and a rim 66. The body 64 includes a body portion 64a, an upper end 64b, and a lower end 64c. The body portion 64a has an inner surface that engages the respective longitudinal rail 28a, 28b. Stated differently, substantially the entire inner surface of the body portion 64a engages the respective longitudinal rail 28a, 28b. With reference to FIG. 6, the body portion 64a also wraps around the upper outboard portion of the outboard side 42d of the respective longitudinal rail 28a, 28b. A protrusion 73 (FIG. 4D) extends from the inner surface of the body portion 64a and is configured to be received in an opening (not shown) formed in the top side 42b of the respective longitudinal rail 28a, 28b. In this way, the protrusion 73 facilitates positioning of the outer member 38a onto the respective longitudinal rail 28a, 28b. In the example illustrated, the protrusion 73 has an oval shape. In some forms, the protrusion 73 may have an annular shape, rectangular shape, or any other shape corresponding to the shape of the opening in the respective longitudinal rail 28a, 28b.

The upper end 64b extends upward from the body portion 64a and is positioned above the top side 42b of the respective longitudinal rail 28a, 28b. In the example illustrated, the upper end 64b extends upward in a substantially vertical direction from the body portion 64a and does not engage the respective longitudinal rail 28a, 28b (i.e., the upper end 64b is spaced apart from the respective longitudinal rail 28a, 28b). With reference to FIG. 9, the lower end 64c extends downward from the body portion 64a and is positioned below the bottom side 42c of the respective longitudinal rail 28a, 28b. In the example illustrated, the lower end 64c extends downward in a substantially vertical direction from the body portion 64a and does not engage the respective longitudinal rail 28a, 28b (i.e., the lower end 64c is spaced apart from the respective longitudinal rail 28a, 28b). At least one fastener 69 such as a bolt, screw, or rivet, for example, extends through an aperture 67a (FIG. 4D) in the lower end 64c of the outer member 38a and an aperture 67b (FIG. 4D) in the lower end 44c of the inner member 36a, thereby removably securing the inner member 36a and the outer member 38a to each other. In the example illustrated, the lower end 44c of the inner member 36a and the lower end 64c of the outer member 38a engage each other at a location along the outboard side 42d of the respective longitudinal rail 28a, 28b.

The rim 66 extends substantially perpendicularly from a periphery of the body 64 and extends at least partially around the periphery of the body 64. In this way, the stiffness of the outer member 38a is enhanced. A fastener 70 such as a bolt, screw, or rivet, for example, extends through a respective aperture 71a (FIG. 4D) formed in the upper end 64b of the outer member 38a above the top side 42b of the respective longitudinal rail 20a and through a respective aperture 71b (FIG. 4D) formed in the upper end 44b of the inner member 36a above the top side 42b of the respective longitudinal rail 28a, 28b. In this way, the inner member 36a and the outer member 38a are further removably secured to each other in a clamping configuration. In the example illustrated, the upper end 64b of the outer member 38a and the upper end 44b of the inner member 36a engage each other at a location along the inboard side 42a of the respective longitudinal rail 28a, 28b.

With reference to FIG. 6, the mounting structure 40a extends at least partially through a respective opening 87 (FIG. 7) in a floor 84 of the cargo bed 14 such that the mounting structure 40a is accessible from the floor 84. In the example illustrated, the mounting structure 40a extends from the inner member 36a of the mounting bracket 30a. In some forms, the mounting structure 40a may extend from the outer member 38a of the mounting bracket 30a without departing from the scope of the present disclosure. In the example illustrated, the mounting structure 40a extends upwardly at least partially through the floor 84 of the cargo bed 14 and is positioned below ridges 86 of the cargo bed 14. In this way, cargo (not shown) disposed within the cargo bed 14 is not obstructed by the mounting structures 40a. In some forms, the mounting structure 40a is flush with the ridges 86 of the cargo bed 14. The mounting structure 40a comprises an opening that is configured to cooperate with towing components such as legs of a fifth wheel platform, an above-bed hitch mounting mechanism, chain tie down members, or other items that desire a high degree of strength to provide a robust attachment. In some forms, the mounting structure 40a includes internal and/or external threads (not shown) to facilitate attachment with the towing components. The mounting structure 40a is also positioned between two adjacent ridges 86 of the cargo bed 14 and is sized to allow a variety of uses of the mounting structure 40a using a common fastener such as a bolt or screw.

With reference to FIGS. 4C and 5C, mounting bracket 30b includes an inner member 36b, an outer member 38b and a mounting structure 40b. The inner member 36b of mounting bracket 30b includes a body 144 and a rim 146. The body 144 includes a body portion 144a, an upper end 144b, and a lower end 144c. The body portion 144a has an inner surface 148a that engages the respective longitudinal rail 28a, 28b. With reference FIG. 6, the body portion 144a also wraps around the lower inboard portion of the inboard side 42a of the respective longitudinal rail 28a, 28b. The body portion 144b of the mounting bracket 30b includes a channel 50 formed therein that is configured to receive vehicle components 51 (e.g., one or more brake lines and/or one or more wire harnesses). In this way, the subframe attachment system 15 accommodates vehicles components 51 between the body portion 144b and the inboard side 42a of the respective longitudinal rail 28a, 28b without the need to reroute or modify positioning of the vehicle components 51. It should be understood that although mounting bracket 30b of the subframe attachment system 15 includes the channel 50, one or more of the mounting brackets 30a, 30c, 30d may also include the channel 50 without departing from the scope of the present disclosure.

The upper end 144b extends upward from the body portion 144a and is positioned above the top side 42b of the respective longitudinal rail 28a, 28b and the lower end 144c extends downward from the body portion 144a and is positioned below the bottom side 42c of the respective longitudinal rail 28a, 28b. The structure and function of the upper and lower ends 144b, 144c are similar or identical to that of the upper and lower ends 44b, 44c, respectively, described above, and therefore will not be described again in detail. The rim 146 extends substantially perpendicular from a periphery of the body 144 and extends at least partially around the periphery of the body 144. In this way, the stiffness of the inner member 36b is enhanced.

The outer member 38b is located at the outboard side 42d of the respective longitudinal rail 28a, 28b of the vehicle frame 26 and at least partially wraps around the outboard side 42d of the respective longitudinal rail 28a, 28b. That is, in the example illustrated, the outer member 38b wraps around an upper outboard portion of the outboard side 42d of the respective longitudinal rail 28a, 28b. In some forms, the outer member 38b may wrap around one or both of a lower outboard portion of the outboard side 42d of the respective longitudinal rail 28a, 28b and the upper outboard portion of the outboard side 42d of the respective longitudinal rail 28a, 28b without departing from the scope of the present disclosure. The outer member 38b includes a body 164 and a rim 166. The body 164 includes a body portion 164a, an upper end 164b, and a lower end 164c. The structure and function of the body portion 164a, the upper end 164b, and the lower end 164c may be similar or identical to that of the body portion 64a, the upper end 64b, and the lower end 64c described above, and therefore, will not be described again in detail. With reference to FIG. 6, the mounting structure 40b extends at least partially through a respective opening 87 in the floor 84 of the cargo bed 14 such that the mounting structure 40b is accessible from the floor 84. The structure and function of the mounting structure 40b may be similar or identical to that of mounting structure 40a described above, and therefore, will not be described again in detail.

Figure 7:
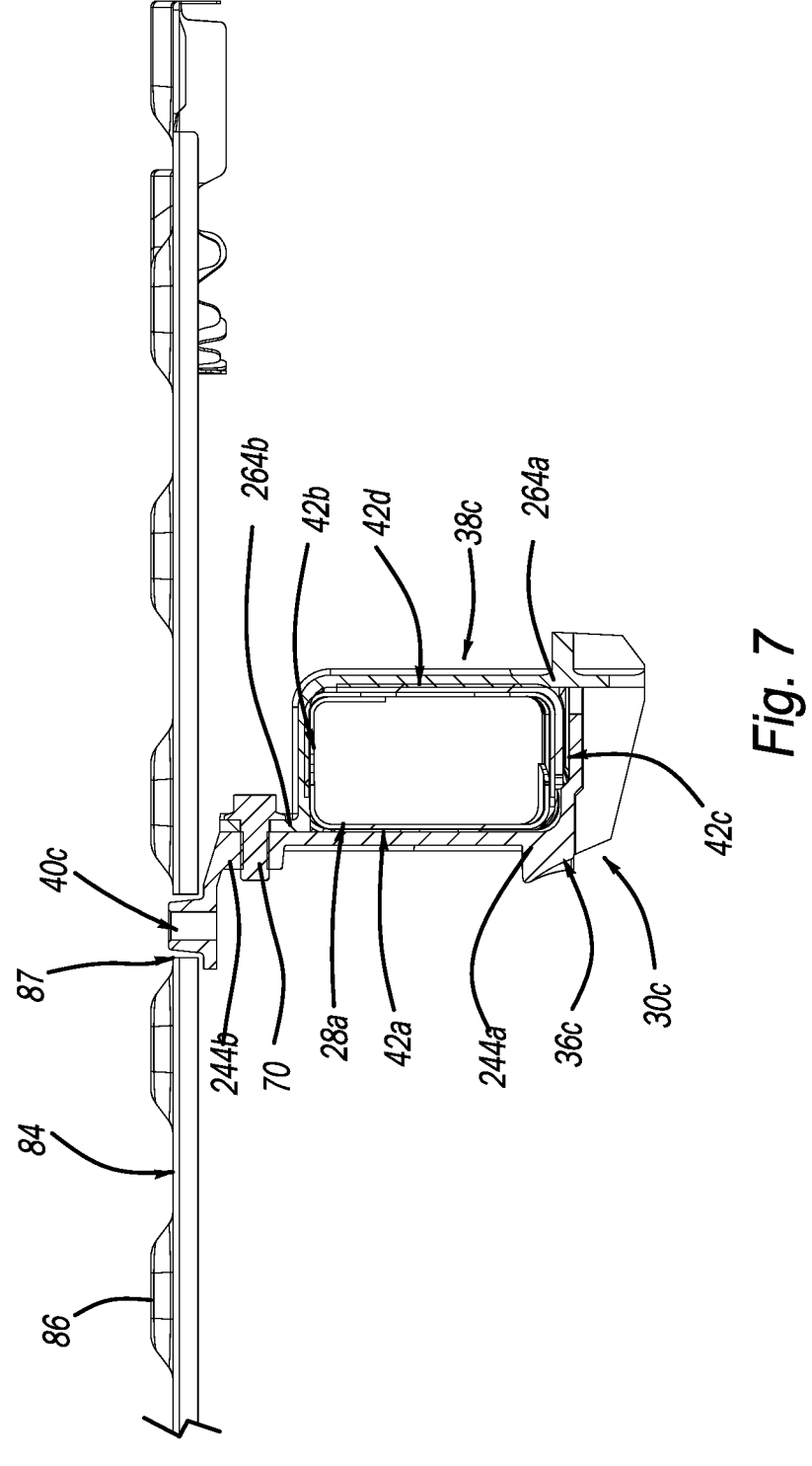
FIG. 7 is another cross-sectional view of a portion of the subframe attachment system of FIG. 1, taken along line 7-7 shown in FIG. 3.
Figure 10:
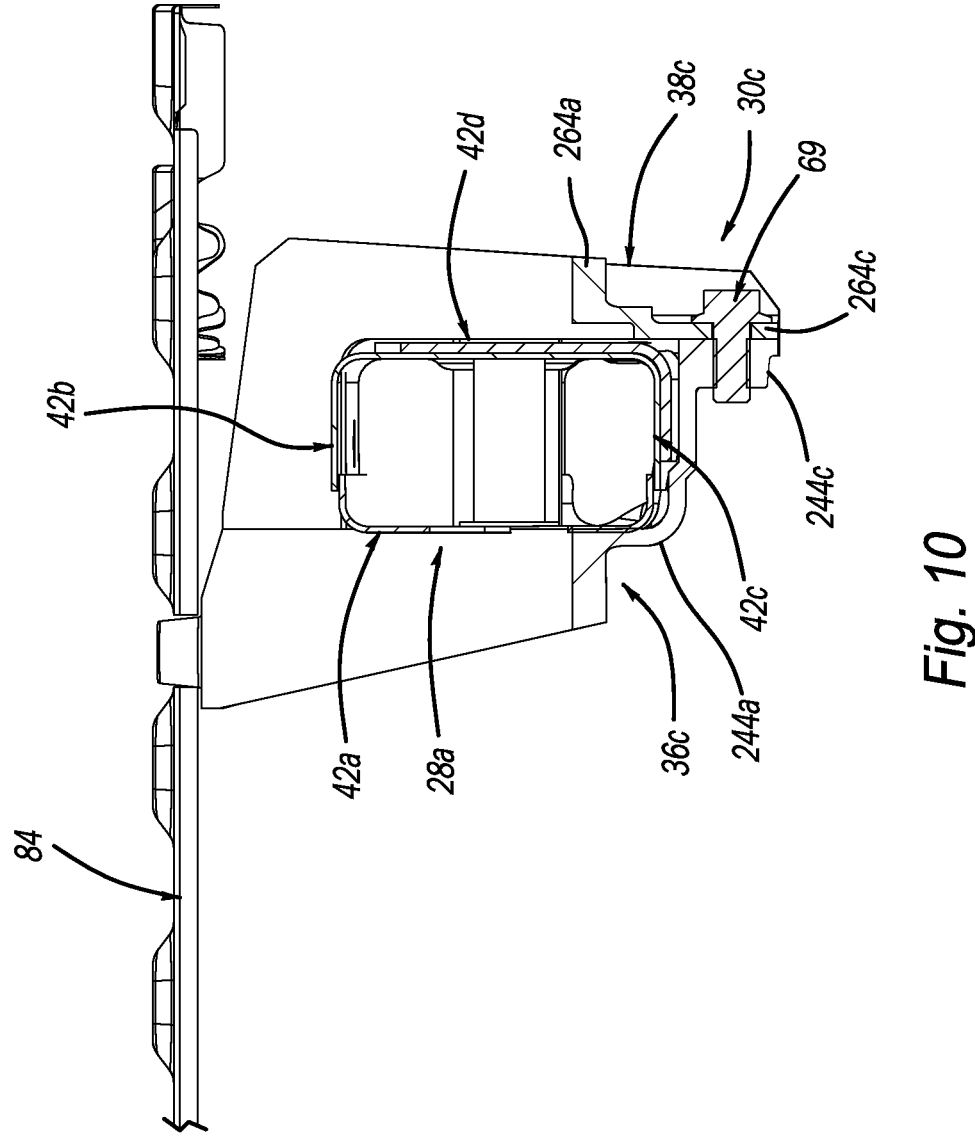
FIG. 10 is another cross-sectional view of a portion of the subframe attachment system of FIG. 1, taken along line 10-10 shown in FIG. 3.

With reference to FIGS. 4B and 5B, mounting bracket 30c includes an inner member 36c, an outer member 38c and a mounting structure 40c. The inner member 36c of mounting bracket 30c includes a body 244 and a rim 246. The body 244 includes a body portion 244a, an upper end 244b, and a lower end 244c (FIG. 10). The body portion 244a has an inner surface that engages the respective longitudinal rail 28a, 28b. Stated differently, substantially the entire inner surface of the body portion 244a engages the respective longitudinal rail 28a, 28b. With reference to FIG. 7, the body portion 244a also wraps around the lower inboard portion of the inboard side 42a of the respective longitudinal rail 28a, 28b. The upper end 244b extends upward from the body portion 244a and is positioned above the top side 42b of the respective longitudinal rail 28a, 28b. In the example illustrated, the upper end 244b extends upward in a substantially vertical direction from the body portion 244a and does not engage the respective longitudinal rail 28a, 28b (i.e., the upper end 244b is spaced apart from the respective longitudinal rail 28a, 28b). With reference to FIG. 10, the lower end 244c extends downward from the body portion 244a and is positioned below the bottom side 42c of the respective longitudinal rail 28a, 28b. In the example illustrated, the lower end 244c extends downward in a substantially vertical direction from the body portion 244a and does not engage the respective longitudinal rail 28a, 28b (i.e., the lower end 244c is spaced apart from the respective longitudinal rail 28a, 28b). The rim 246 (FIG. 4B) extends substantially perpendicular from a periphery of the body 244 and extends at least partially around the periphery of the body 244. In this way, the stiffness of the inner member 36c is enhanced.

With reference to FIGS. 4B and 5B, in the subframe attachment system 15 of the present disclosure, the mounting bracket 30c further includes an extension or an inner rail attachment portion 54 that extends rearward from the body 244 of the inner member 36c. A protrusion 56 (FIG. 8) extends from an inner surface (the inner surface faces the inboard side 42a of the respective longitudinal rail 28a, 28b) of the extension 54 and is configured to be received in an opening formed in the inboard side 42a of the respective longitudinal rail 28a, 28b. In this way, the protrusion 56 facilitates positioning of the inner member 36c of the mounting bracket 30c onto the respective longitudinal rail 28a, 28b. In the example illustrated, the protrusion 56 has an annular shape. In some forms, the protrusion 56 may have an oval shape, rectangular shape, or any other shape corresponding to the shape of the opening in the respective longitudinal rail 28a, 28b. In the example illustrated, the protrusion 56 also surrounds an aperture 59 formed in the extension 54 and aligned with the opening in the respective longitudinal rail 28a, 28b.

The outer member 38c is located at the outboard side 42d of the respective longitudinal rail 28a, 28b of the vehicle frame 26 and at least partially wraps around the outboard side 42d of the respective longitudinal rail 28a, 28b. That is, in the example illustrated, the outer member 38c wraps around an upper outboard portion of the outboard side 42d of the respective longitudinal rail 28a, 28b. In some forms, the outer member 38c may wrap around one or both of a lower outboard portion of the outboard side 42d of the respective longitudinal rail 28a, 28b and the upper outboard portion of the outboard side 42d of the respective longitudinal rail 28a, 28b without departing from the scope of the present disclosure. The outer member 38c includes a body 264 and a rim 266. The body 264 includes a body portion 264a, an upper end 264b, and a lower end 264c (FIG. 10). The body portion 264a has an inner surface 268 that engages the respective longitudinal rail 28a, 28b. The body portion 264a also wraps around the upper outboard portion of the outboard side 42d of the respective longitudinal rail 28a, 28b.

The upper end 264b extends upward from the body portion 264a and is positioned above the top side 42b of the respective longitudinal rail 28a, 28b. In the example illustrated, the upper end 264b extends upward in a substantially vertical direction from the body portion 264a and does not engage the respective longitudinal rail 28a, 28b (i.e., the upper end 264b is spaced apart from the respective longitudinal rail 28a, 28b). The lower end 264c extends downward from the body portion 264a and is positioned below the bottom side 42c of the respective longitudinal rail 28a, 28b. In the example illustrated, the lower end 264c extends downward in a substantially vertical direction from the body portion 264a and does not engage the respective longitudinal rail 28a, 28b (i.e., the lower end 264c is spaced apart from the respective longitudinal rail 28a, 28b). At least one fastener 69 such as a bolt, screw, or rivet, for example, extends through an aperture 267a (FIG. 4B) in the lower end 264c of the outer member 38c and an aperture in the lower end 244c of the inner member 36c, thereby removably securing the inner member 36c and the outer member 38c to each other. In the example illustrated, the lower end 244c of the inner member 36c and the lower end 264c of the outer member 38c engage each other at a location along the outboard side 42d of the respective longitudinal rail 28a, 28b.

The rim 266 extends substantially perpendicularly from a periphery of the body 264 and extends at least partially around the periphery of the body 264. In this way, the stiffness of the outer member 38c is enhanced. A fastener 70 such as a bolt, screw, or rivet, for example, extends through a respective aperture 271a formed in the upper end 264b of the outer member 38c above the top side 42b of the respective longitudinal rail 20a and through a respective aperture formed in the upper end 244b of the inner member 36c above the top side 42b of the respective longitudinal rail 28a, 28b. In this way, the inner member 36c and the outer member 38c are further removably secured to each other in a clamping configuration. In the example illustrated, the upper end 264b of the outer member 38c and the upper end 244b of the inner member 36c engage each other at a location along the inboard side 42a of the respective longitudinal rail 28a, 28b.

With reference to FIGS. 4B and 5B, in the subframe attachment system 15 of the present disclosure, the mounting bracket 30c further includes an extension or an outer rail attachment portion 74 that extends rearward from the body 264 of the outer member 38c. A protrusion 76 extends from an inner surface (the inner surface faces the outboard side 42d of the respective longitudinal rail 28a, 28b) of the extension 74 and is configured to be received in an opening formed in the outboard side 42d of the respective longitudinal rail 28a, 28b. In this way, the protrusion 76 facilitates positioning of the outer member 38c of the mounting bracket 30c onto the respective longitudinal rail 28a, 28b. In the example illustrated, the protrusion 76 has an annular shape. In some forms, the protrusion 76 may have an oval shape, rectangular shape, or any other shape corresponding to the shape of the opening in the respective longitudinal rail 28a, 28b. In the example illustrated, the protrusion 76 also surrounds an aperture 81 formed in the extension 74 and aligned with the opening in the respective longitudinal rail 28a, 28b.

Figure 8:
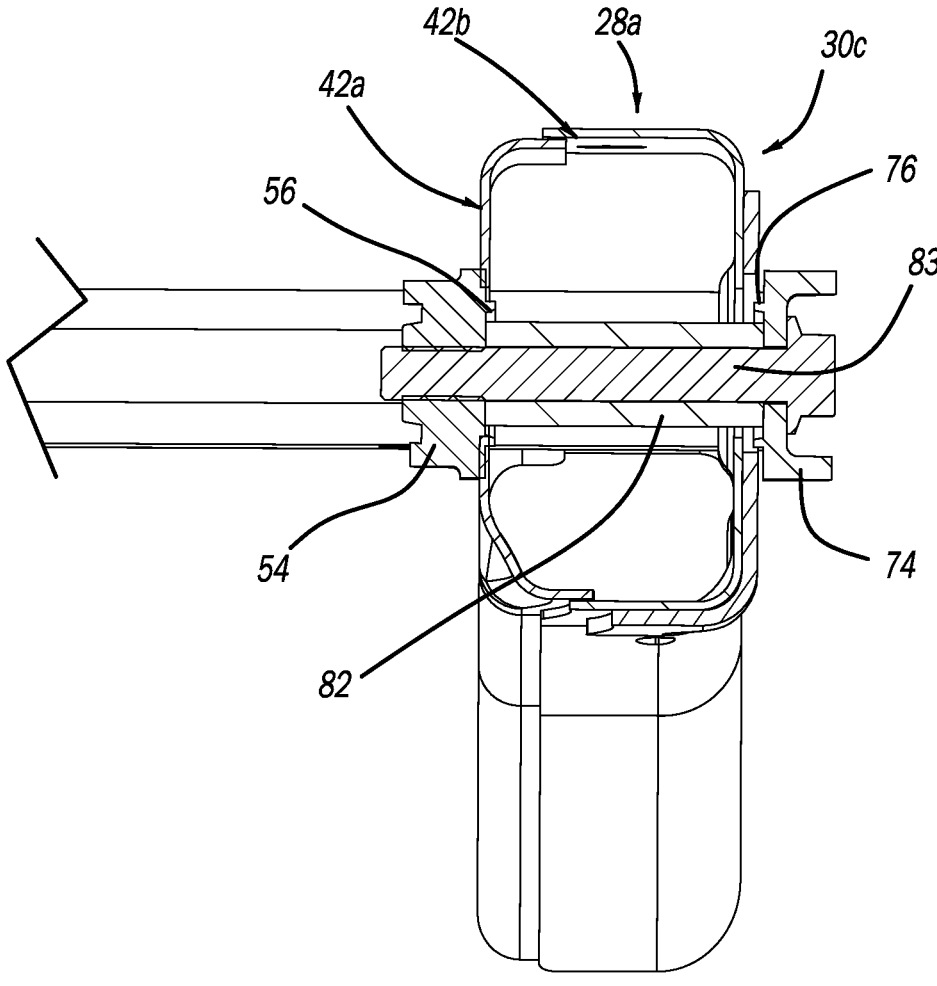
FIG. 8 is another cross-sectional view of a portion of the subframe attachment system of FIG. 1, taken along line 8-8 shown in FIG. 3.

With reference to FIGS. 4B and 8, a compression tube or compression limiter 82 extends at least partially through the respective longitudinal rail 28a, 28b and engages the extension 54 of the inner member 36c and the extension 74 of the outer member 38c. The compression limiter 82 inhibits the longitudinal rail 28a, 28b from deforming during assembly of the subframe attachment system 15 to the vehicle 10, for example. A fastener 83 such as a bolt or screw, for example, extends through the compression limiter 82, the aperture 81 formed in the extension 74 of the outer member 38c, the aperture 59 formed in the extension 54 of the inner member 36c, and the respective longitudinal rail 28a, 28b, thereby securing the compression limiter 82, and the extensions 54, 74, of the inner and outer members 36c, 38c, respectively, to the respective longitudinal rail 28a, 28b. The mounting structure 40c extends at least partially through a respective opening 87 in the floor 84 of the cargo bed 14 such that the mounting structure 40c is accessible from the floor 84. The structure and function of the mounting structure 40c may be similar or identical to that of mounting structure 40a described above, and therefore will not be described again in detail.

With reference to FIGS. 4A and 5A, mounting bracket 30d includes an inner member 36d, an outer member 38d and a mounting structure 40d. The inner member 36d of mounting bracket 30 includes a body 344 and a rim 346. The body 344 includes a body portion 344a, an upper end 344b, and a lower end 344c. The body portion 344a has an inner surface 348a that engages the respective longitudinal rail 28a, 28b. The body portion 344a also wraps around the lower inboard portion of the inboard side 42a of the respective longitudinal rail 28a, 28b. The structure and function of the body portion 344a is similar or identical to the body portion 244a described above, and therefore, will not be described again in detail. The upper end 344*b* extends upward from the body portion 344*a* and is positioned above the top side 42*b* of the respective longitudinal rail 28*a*, 28*b* and the lower end 344*c* extends downward from the body portion 344*a* and is positioned below the bottom side 42*c* of the respective longitudinal rail 28*a*, 28*b*. The structure and function of the upper and lower ends 344*b*, 344*c* are similar or identical to the upper and lower ends 244*b*, 244*c*, respectively, described above, and therefore will not be described again in detail. The rim 346 extends substantially perpendicular from a periphery of the body 344 and extends at least partially around the periphery of the body 344. In this way, the stiffness of the inner member 36*d* is enhanced. The mounting bracket 30*d* further includes an extension 354 that extends rearward from the body 344 of the inner member 36*d*. The structure and function of the extension 354 is similar or identical to the extension 54 described above, and therefore, will not be described again in detail.

The outer member 38*d* is located at the outboard side 42*d* of the respective longitudinal rail 28*a*, 28*b* of the vehicle frame 26 and at least partially wraps around the outboard side 42*d* of the respective longitudinal rail 28*a*, 28*b*. That is, in the example illustrated, the outer member 38*d* wraps around an upper outboard portion of the outboard side 42*d* of the respective longitudinal rail 28*a*, 28*b*. The outer member 38*d* includes a body 364 and a rim 366. The body 364 includes a body portion 364*a*, an upper end 364*b*, and a lower end 364*c*. The structure and function of the body portion 364*a*, the upper end 364*b*, and the lower end 364*c* may be similar or identical to that of the body portion 264*a*, the upper end 264*b*, and the lower end 264*c* described above, and therefore, will not be described again in detail. The outer member 38*d* further includes an extension portion 374 that extends rearward from the body 364 of the outer member 38*d*. Compression limiter 382 engages both the extension portion 374 of the outer member 38*d* and the extension portion 354 of the inner member 38*d*. The structure and function of the extension 374 and the compression limiter 382 are similar or identical to the extension 74 and compression limiter 82, respectively, described above, and therefore, will not be described again in detail.

The mounting structure 40*d* extends at least partially through a respective opening 87 in the floor 84 of the cargo bed 14 such that the mounting structure 40*d* is accessible from the floor 84. The structure and function of the mounting structure 40*d* may be similar or identical to that of mounting structure 40*a* described above, and therefore will not be described again in detail.

Figure 11:
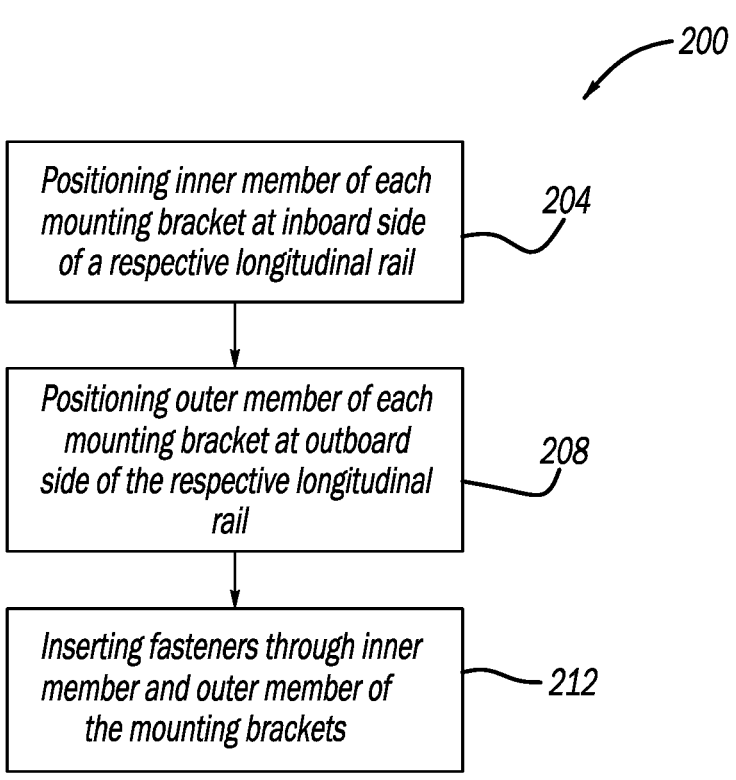
FIG. 11 is a flowchart illustrating a method for securing mounting brackets to a vehicle frame according to the principles of the present disclosure.

With reference to FIG. 11, a method 200 for securing the mounting brackets 30*a*, 30*b*, 30*c*, 30*d* to the vehicle frame 26 is described in detail. First, at 204, the inner member 36*a*, 36*b*, 36*c*, 36*d* is positioned at the inboard side 42*a* of a respective longitudinal rail 28*a*, 28*b* such that the mounting structure 40*a*, 40*b*, 40*c*, 40*d* extends at least partially through the respective opening 87 in the floor 84 of the cargo bed 14 and is accessible from above the floor 84. In some forms, the inner member 36*a*, 36*b*, 36*c*, 36*d* is positioned at the inboard side 42*a* of the respective longitudinal rail 28*a*, 28*b* while the cargo bed 14 is secured to the vehicle frame 26. In other forms, the inner member 36*a*, 36*b*, 36*c*, 36*d* is positioned at the inboard side 42*a* of the respective longitudinal rail 28*a*, 28*b* while the cargo bed 14 is removed from the vehicle frame 26.

Then, at 208, the outer member 38*a*, 38*b*, 38*c*, 38*d* is positioned at the outboard side 42*d* of the respective longitudinal rail 28*a*, 28*b*. In some forms, the outer member 38*a*, 38*b*, 38*c*, 38*d* is positioned at the outboard side 42*d* of the respective longitudinal rail 28*a*, 28*b* while the cargo bed 14 is secured to the vehicle frame 26. In other forms, the outer member 38*a*, 38*b*, 38*c*, 38*d* is positioned at the outboard side 42*d* of the respective longitudinal rail 28*a*, 28*b* while the cargo bed 14 is removed from the vehicle frame 26. Then, at 212, fasteners 69, 70 are inserted through the inner member 36*a*, 36*b*, 36*c*, 36*d* and the outer member 38*a*, 38*b*, 38*c*, 38*d* to secure the inner member 36*a*, 36*b*, 36*c*, 36*d* and the outer member 38*a*, 38*b*, 38*c*, 38*d* to each other and fastener 83 is inserted through the compression limiter 82, 382, the inner member 36*c*, 36*d* and the outer member 38*c*, 38*d* to further secure the inner member 36*c*, 36*d* and the outer member 38*c*, 38*d* to each other.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A subframe attachment system for a vehicle having a cargo bed, the subframe attachment system comprising:

a plurality of mounting brackets spaced apart from each other and configured to be attached to first and second longitudinal rails of a vehicle frame independently of each other, each mounting bracket of the plurality of mounting brackets including a mounting structure configured to be accessible from the cargo bed; each mounting bracket of the plurality of mounting bracket further includes:

an inner member located at an inboard side of a respective longitudinal rail of the first and second longitudinal rails and including a first upper end, a first lower end, and a first body portion, the first upper end positioned above a top side of the respective longitudinal rail and the first lower end positioned below a bottom side of the respective longitudinal rail, the first body portion connecting the first upper end to the first lower end; and an outer member located at an outboard side of the respective longitudinal rail and including a second upper end, a second lower end, and a second body portion, the second upper end positioned above the top side of the respective longitudinal rail and secured to the first upper end of the inner member, the second lower end position below the bottom side of the respective longitudinal rail and secured to the first lower end, the second body portion connecting the second upper end to the second lower end.

2. The subframe attachment system of claim 1, wherein the plurality of mounting brackets includes four mounting brackets.

3. The subframe attachment system of claim 1, wherein at least one mounting bracket of the plurality of mounting brackets includes:

an outer rail attachment portion extending from the second body portion of the outer member and configured to be mounted to the outboard side of the respective longitudinal rail; and an inner rail attachment portion extending from the first body portion of the inner member and configured to be mounted to the inboard side of the respective longitudinal rail.

4. The subframe attachment system of claim 3, further comprising a compression tube configured to extend at least partially through the respective longitudinal rail and engaging the outer rail attachment portion and the inner rail attachment portion.

5. The subframe attachment system of claim 4, further comprising a fastener extending through the outer rail attachment portion, the inner rail attachment portion, and the compression tube to secure the inner member, the outer member and the compression tube to each other.

6. The subframe attachment system of claim 3, wherein a first annular protrusion extending from a first surface of the outer rail attachment portion facing the outboard side of the respective longitudinal rail and configured to be received in a first opening formed in the outboard side of the respective longitudinal rail; and a second annular protrusion extending from a second surface of the inner rail attachment portion facing the inboard side of the respective longitudinal rail and configured to be received in a second opening formed in the inboard side of the respective longitudinal rail.

7. The subframe attachment system of claim 1, wherein the inner member of each mounting bracket of the plurality of mounting brackets has an L-shaped cross-section.

8. The subframe attachment system of claim 1, further comprising:

a first fastener extending through the first upper end of the inner member and the second upper end of the outer member to secure the inner member and the outer member to each other;

a second fastener extending through the first lower end of the inner member and the second lower end of the outer member to further secure the inner member and the outer member to each other.

9. The subframe attachment system of claim 1, wherein at least one mounting bracket of the plurality of mounting brackets includes the inner member having a channel formed in the first body portion that is configured to receive one or more vehicle components.

10. The subframe attachment system of claim 9, wherein the one or more vehicle components include at least one of a brake line and a wire harness.

11. The subframe attachment system of claim 1, further comprising the cargo bed having a floor, the floor of the cargo bed defining apertures through which the mounting structures are accessible from above the floor of the cargo bed.

12. The subframe attachment system of claim 1, wherein at least one mounting bracket of the plurality of mounting brackets includes an annular protrusion extending from a bottom surface of the second upper end of the outer member and is configured to be received in an opening formed in the top side of the respective longitudinal rail.

13. A subframe attachment system for a vehicle having a cargo bed, the subframe attachment system comprising:

a plurality of mounting brackets configured to be secured to first and second longitudinal rails of a vehicle frame independently of each other, each mounting bracket of the plurality of mounting brackets including a mounting structure configured to be accessible from the cargo bed; each mounting bracket of the plurality of mounting bracket further includes:

an inner member located at an inboard side of a respective longitudinal rail of the first and second longitudinal rails and including a first upper end, a first lower end, and a first body portion, the first upper end positioned above a top side of the respective longitudinal rail and the first lower end positioned below a bottom side of the respective longitudinal rail, the first body portion connecting the first upper end to the first lower end;

an outer member located at an outboard side of the respective longitudinal rail and including a second upper end, a second lower end, and a second body portion, the second upper end positioned above the top side of the respective longitudinal rail and secured to the first upper end of the inner member, the second lower end positioned below the bottom side of the respective longitudinal rail and secured to the first lower end, the second body portion connecting the second upper end to the second lower end;

at least one first fastener extending through the first upper end of the inner member and the second upper end of the outer member to secure the inner member and the outer member to each other; and at least one second fastener extending through the first lower end of the inner member and the second lower end of the outer member to further secure the inner member and the outer member to each other, wherein the mounting structure of each mounting bracket extends from the inner member and extends at least partially through a respective access opening in the cargo bed.

14. The subframe attachment system of claim 13, wherein at least one mounting bracket of the plurality of mounting brackets includes:

an outer rail attachment portion extending from the second body portion of the outer member and configured to be mounted to the outboard side of the respective longitudinal rail; and an inner rail attachment portion extending from the first body portion of the inner member and configured to be mounted to the inboard side of the respective longitudinal rail.

15. The subframe attachment system of claim 14, further comprising a compression tube configured to extend at least partially through the respective longitudinal rail and engaging the outer rail attachment portion and the inner rail attachment portion.

16. The subframe attachment system of claim 15, further comprising a third fastener extending through the outer rail attachment portion, the inner rail attachment portion, and the compression tube to secure the inner member, the outer member and the compression tube to each other.

17. The subframe attachment system of claim 13, wherein at least one mounting bracket of the plurality of mounting brackets includes the inner member having a channel formed in the first body portion that is configured to receive one or more vehicle components.

18. The subframe attachment system of claim 13, further comprising the vehicle frame including the first and second longitudinal rails.

19. The subframe attachment system of claim 13, wherein at least one mounting bracket of the plurality of mounting brackets includes an annular protrusion extending from a bottom surface of the second upper end of the outer member and is configured to be received in an opening formed in the top side of the respective longitudinal rail.

20. A method for securing a plurality of mounting brackets to first and second longitudinal rails of a vehicle frame having a cargo bed secured thereto, the method comprising:

positioning an inner member of each mounting bracket of the plurality of mounting brackets at an inboard side of a respective longitudinal rail of the first and second longitudinal rails while the cargo bed is secured to the vehicle frame, the inner member includes a first upper end, a first lower end, and a first body portion connecting the first upper end to the first lower end, the first upper end positioned above a top side of the respective longitudinal rail and the first lower end positioned below a bottom side of the respective longitudinal rail;

positioning an outer member of each mounting bracket of the plurality of mounting brackets at an outboard side of the respective longitudinal rail while the cargo bed is secured to the vehicle frame, the outer member includes a second upper end, a second lower end, and a second body portion connecting the second upper end to the second lower end, the first upper end positioned above a top side of the respective longitudinal rail and the first lower end positioned below a bottom side of the respective longitudinal rail;

inserting at least one first fastener through the first upper end of the inner member and the second upper end of the outer member to secure the inner member and the outer member to each other; and inserting at least one second fastener through the first lower end of the inner member and the second lower end of the outer member to further secure the inner member and the outer member to each other.

\* \* \* \* \*